United States Patent
Majkrzak et al.

[15] 3,704,499
[45] Dec. 5, 1972

[54] METHOD OF PRODUCING A NOZZLE FOR A TURBOGENERATOR

[72] Inventors: Charles P. Majkrzak, Nutley; Michael S. Polgar, Eatontown, both of N.J.

[73] Assignee: International Telephone and Telegraph Corporation, Nutley, N.J.

[22] Filed: Oct. 6, 1970

[21] Appl. No.: 78,635

Related U.S. Application Data

[62] Division of Ser. No. 556,990, June 13, 1966, Pat. No. 3,449,589 which is a continuation of Ser. No. 807,161, Feb. 10, 1969.

[52] U.S. Cl. ..............................29/157 C, 239/488
[51] Int. Cl. .............................................B23p 15/26
[58] Field of Search..............29/157 C; 239/487, 488

[56] References Cited

UNITED STATES PATENTS 2,213,928   9/1940   Gold et al.........................239/487 X
2,362,213   11/1944  Miller et al. ......................239/487 X
1,751,448   3/1930   Campbell.......................29/157 C X
3,326,473   6/1967   Wahlin............................239/487 X Primary Examiner—John F. Campbell
Assistant Examiner—Donald C. Reiley, III
Attorney—C. Cornell Remsen, Jr., Rayson P. Morris, Percy P. Lantzy, Philip M. Bolton and Isidore Togut

[57] ABSTRACT

A method of producing a nozzle for a turbogenerator. A plurality of spiraling grooves are cut on a constant-diameter bar, the bar is tapered by cutting away part of the ridges between the grooves, a cavity is formed with the bar, the cavity is evacuated and sealed, a shroud is formed having a cavity therein, the shroud cavity is evacuated and sealed, and the bar and shroud are assembled together to form a nozzle.

6 Claims, 17 Drawing Figures

PATENTED DEC 5 1972

INVENTORS.
CHARLES P. MAJKRZAK
MICHAEL S. POLGAR

ATTORNEY

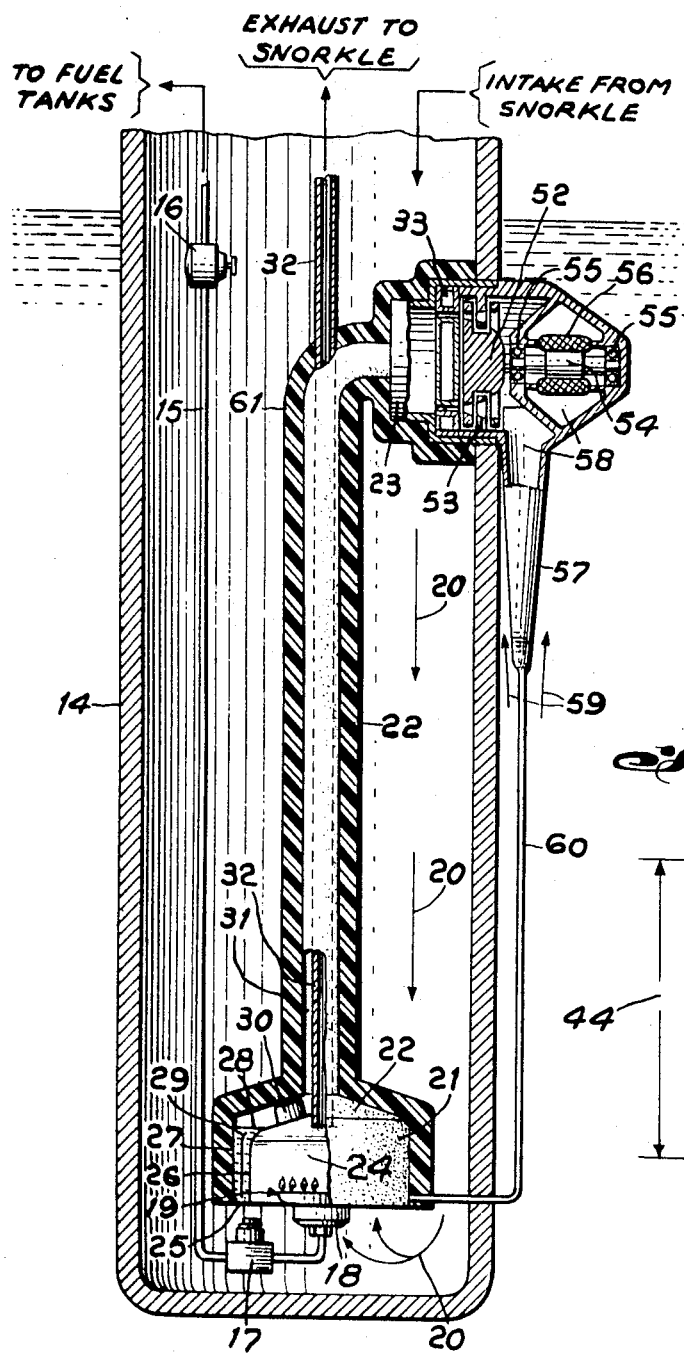
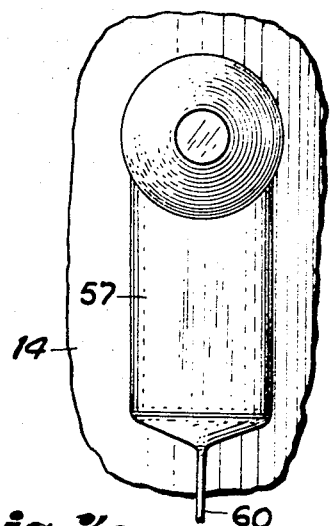
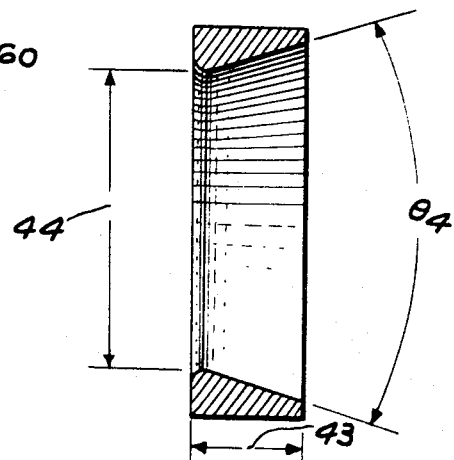

INVENTORS.
CHARLES P. MAJKRZAK
MICHAEL S. POLGAR

ATTORNEY

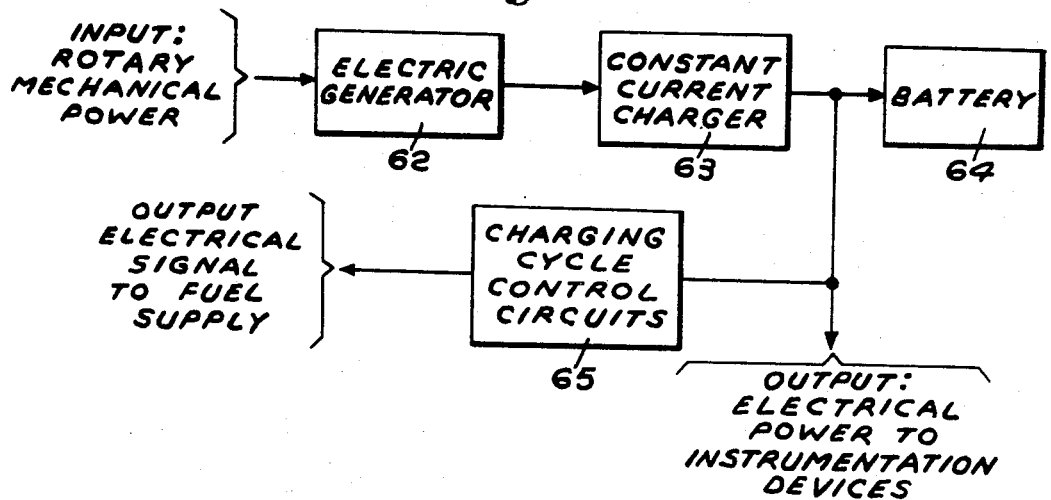
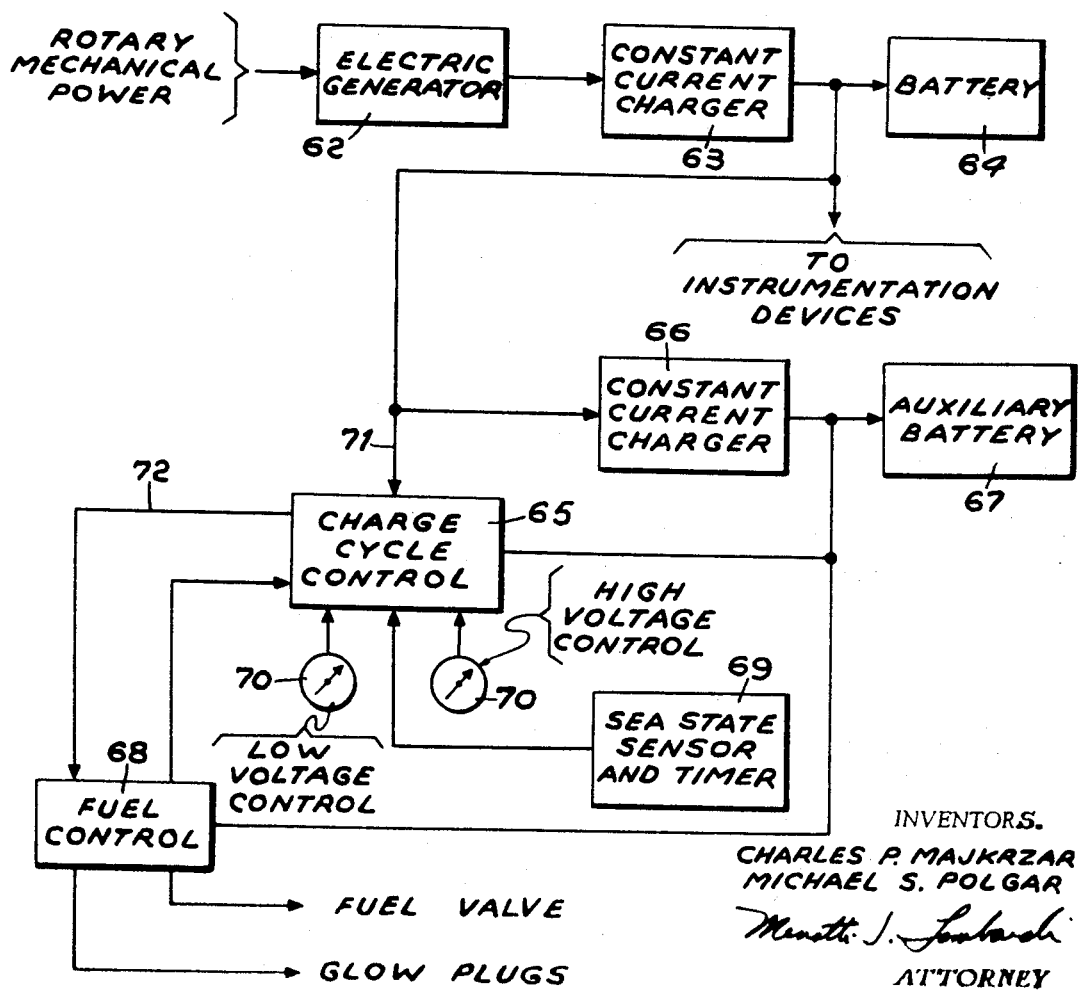

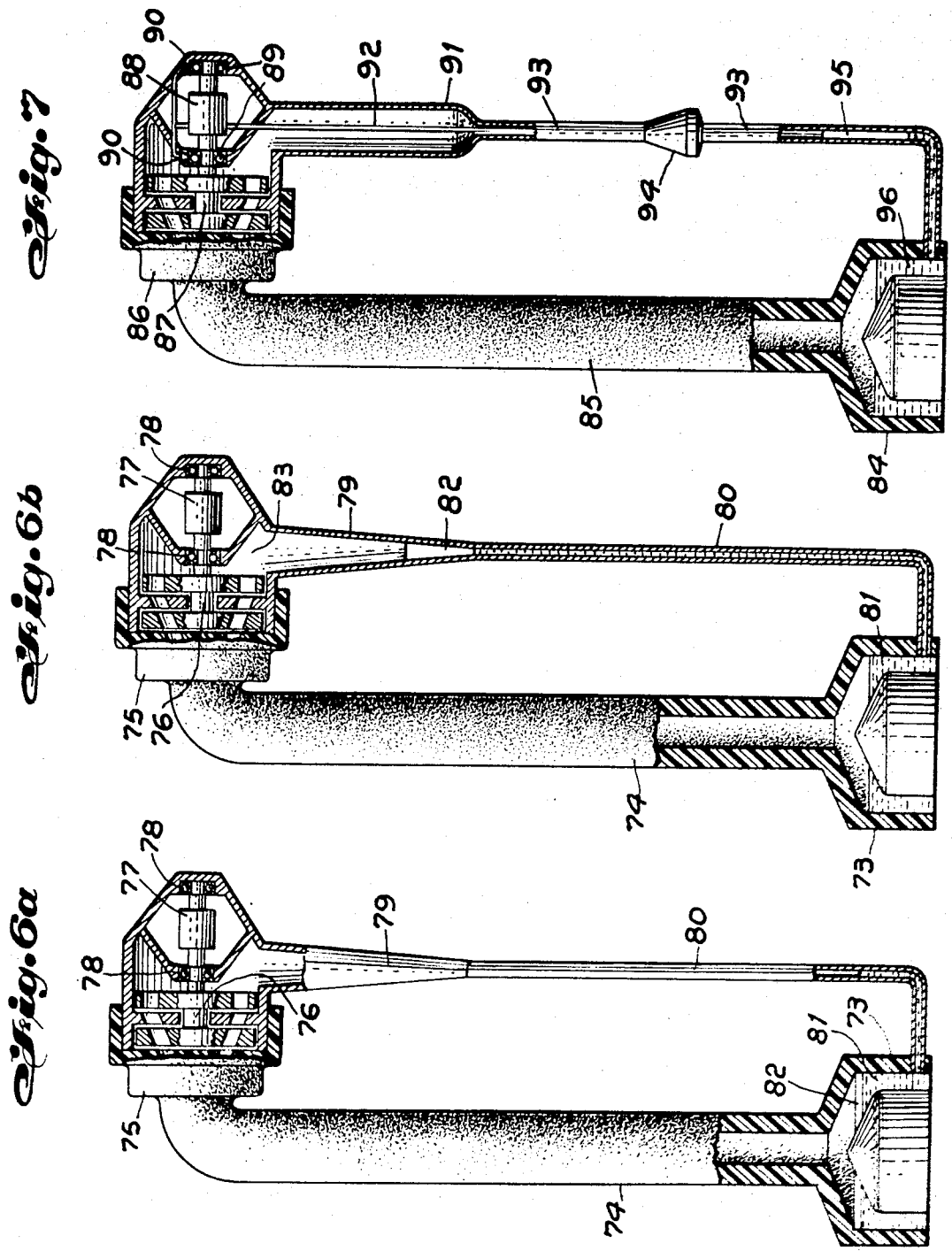

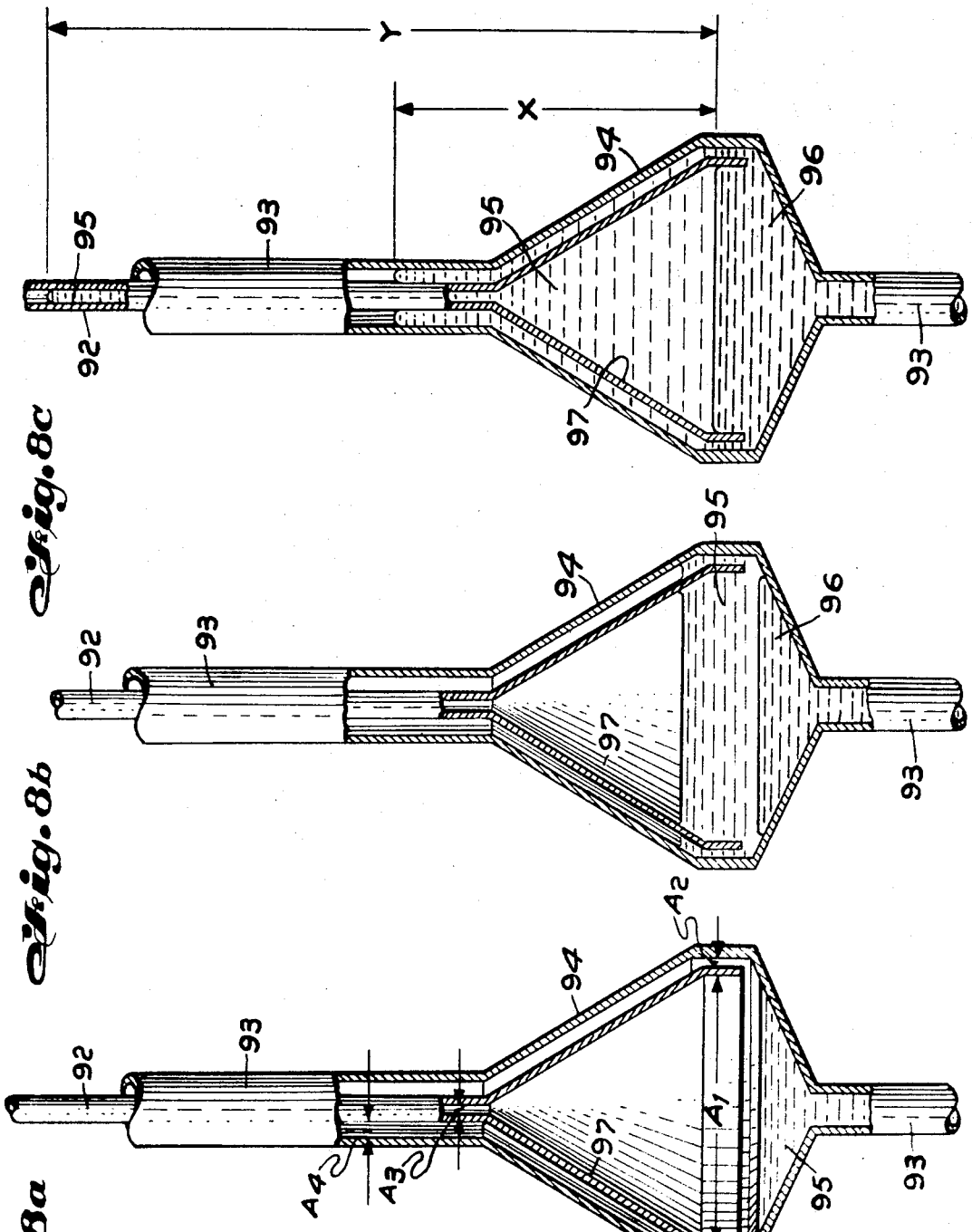

METHOD OF PRODUCING A NOZZLE FOR A TURBOGENERATOR

This application is a continuation of application Ser. No. 807,161, filed Feb. 10, 1969, which is a division of application Ser. No. 556,990, filed June 13, 1966, now U.S. Pat. No. 3,449,589.

This invention relates generally to a power supply system, and more particularly to a power supply system for unattended oceanographic stations.

In recent years there have been increasing demands for dependable low power-generating plants. One important need for such units arises for the powering of long-range telemetering buoys used for collecting and transmitting oceanographic and atmospheric data from extremely remote locations at sea.

It is obvious that a power supply for such application must have characteristics permitting a long uninterrupted life with a reasonably low specific fuel consumption. Internal combustion and other known heat engines in the desired power range have not, as yet, been able to satisfactorily or reliably meet these requirements.

Telemetering stations gather and store meteorologic and oceanographic data at remote marine locations and periodically transmit these bits of information over thousands of miles to shore. Such distance stations are now being considered, developed, and installed to meet the needs of various agencies. Among the necessary equipment for each station is a power device for converting some form of available energy into a useful electrical supply for long-term unattended operation of the detecting, collecting, and transmitting equipment.

Several methods of power consumption have been proposed, investigated, and developed. These include the wind, sea motion, solar radiation, and atomic combustible fuels as sources of energy. Of these, the wind and sea motion have proven unreliable. Dependable solar-energy devices for such use are still under development and are, as yet, unavailable. Atomic fuel devices are heavy and especially costly for the quantities predicted in the future needs of the various agencies. Furthermore, such devices can be dangerous to unsuspecting personnel and can fall into undesirable hands if they break loose from their moorings.

In converting energy from combustible fuels, mechanical-electrical devices are available that have various degrees of reliability and efficiency. The use of the internal-combustion engine, for instance, seems promising. However, the multiplicity of so many necessary components, such as belts, seals, ignition elements, starters, lubricating pumps, filters, etc., tends towards unreliable performance, since the loss of any one item will cause interrupted service requiring a costly and untimely maintenance trip to the remote site.

A different type of mechanical-electrical device is a turbogenerator wherein the need for so many components does not exist. Its use, in the low power output range, offers higher reliability and efficiency than an internal-combustion engine of similar output. Such a turbogenerator in which the heat engine is a mercury-vapor turbine has been conceived, studied, and is described herein to indicate its feasibility and advantages for providing an electrical supply for remote marine stations.

Therefore, an object of this invention is to provide a power supply system for converting some form of available energy into a useful electrical supply for long-termed unattended operation of detecting, collecting, and transmitting equipment.

Another object of this invention is to provide a power supply system for an unattended oceanographic station.

A further object of this invention is to describe a suitable heat engine with an electrical generating and storage system, and to illustrate the feasibility of this combination as a small unattended power plant.

A still further object of this invention is the conversion of combustible fuel energy to battery-stored energy thru the use of a mercury-vapor turbogenerator aboard an unattended oceanographic station.

Yet another object of this invention is the use of the sea as the heat sink for the power supply system disclosed herein.

An additional object of this invention is to provide means for lubricating the turbogenerator according to the invention.

Still another object of this invention is to provide a novel nozzle for use with the turbogenerator according to the invention.

And, an object of this invention is to provide an economically feasible power supply for long uninterrupted life through the use of novel parts, arrangements, combinations, and improvements herein shown and/or described.

According to the broader aspects in the proposed power supply system, a burner heats liquid mercury within a boiler, vaporizes the liquid, and superheats the vapor. After expansion in a novel nozzle the mercury-vapor jet rotates a wheel whose blades travel at a linear velocity suitable in ratio to the vapor velocity. The vapor thereafter passes into a condenser which is cooled by the free circulation of external sea water. The condensed mercury, because of its very high density, returns to the boiler by gravity and so eliminates the need of a boiler feed pump.

Another feature of this invention is the use of the turbine principle because of its simplicity since there is but one moving part, a rotating shaft assembly, and because of the inherent protection of fragile parts from flame. Starting such a unit is known to be extremely easy, requiring but the release and ignition of fuel. Cut off of the fuel supply causes it to stop.

A further feature of this invention is the use of mercury because it provides advantages not readily found in other working substances. Thermodymanically speaking, the use of mercury allows higher efficiency because of the higher obtainable temperature variation. Inherently low blade friction and windage losses are characteristic because of its low saturation pressure. Mercury, an element, is extremely stable, with little or no tendencies to disassociate or to form compounds. Mercury does not amalgamate appreciably with most steels and, therefore, does not change the quality or quantity of heat transfer. From a practical view point, the use of mercury has further advantages over other working substances in that its low saturation pressure makes possible the use of light mechanical incasement, and the occurrence of high specific volumes at operating pressures allows practical dimensioning of nozzles and blades. Its high molecular weight provides for lower jet velocities allowing practical wheels of small diameters and a gravity return which eliminates the need for a boiler-feed pump. Other attractive features exist with the use of mercury. Mercury is not a solvent, and therefore, permits the use of some lubrication. As it solidifies at −38° F, the danger to freezing is decreased and, of course, mercury is non-inflamable. Because the temperatures encountered allow the use of bearings within the condenser casing, the turbine wheel and the alternator (permanent magnet type) can be mounted upon the same shaft. Such construction eliminates the need for shaft seals and provides a completely enclosed system for the mercury and its vapor. The end result is a stability of operation comparable to that of the common household refrigerator which operates for years without maintenance.

Another feature of this invention is the use of propane among the several liquid fuels available. The use of propane is more desirable so as to gain practical advantages not found with the other fuels. The liquified propane is readily available and can be safely transported in tanks to remote sites. Its vapor pressure over a practical temperature range allows the use of light metal containers, and its low specific gravity permits buoyancy of full containers in the sea. When released thru a valve into near-atmospheric pressure, propane returns to a gaseous state and can be easily controlled and metered as a gaseous fuel. It burns without leaving a residue, thus permitting stable operation for long periods without the need for cleaning or maintaining the boiler or flue.

A still further feature is to provide a passive arrangement which automatically causes the lubrication of the mercury-vapor turbogenerator according to the invention.

An additional feature in keeping with the simplicity of design inherent in the proposed system, such that it can be manufactured by ordinary and economical mass-production methods, is the incorporation of a novel type nozzle construction suitable for use with the arrangement according to the invention.

The above-mentioned and other features and objects of this invention will become more apparent by reference to the following description taken in conjunction with the accompanying drawings, in which:

FIG. 2 is a section view of the power supply package shown in FIG. 1;

FIG. 2a is an end view of the condenser shown in FIG. 2;

FIGS. 3a through 3f illustrate the nozzle used in connection with this invention;

FIG. 4 is a schematic diagram of the basic energy conversion system according to the invention;

FIG. 5 is a detail schematic diagram of the operation of the energy conversion system according to the invention;

FIGS. 6a and 6b show a means of lubricating the system shown in FIG. 2;

FIG. 7 shows another means of lubricating the system of FIG. 2; and

FIGS. 8a, 8b, and 8c illustrate the operation of the means shown in FIG. 7.

Figure 1:
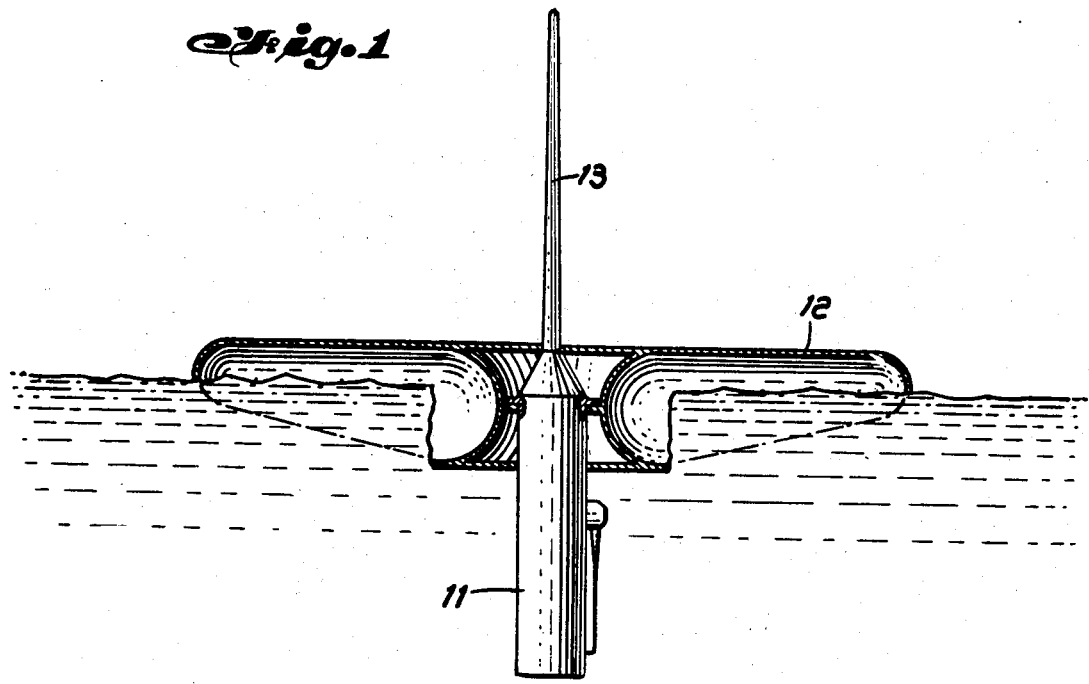
FIG. 1 shows the power supply system for unattended telemetering station according to the invention.

The power supply system for an unattended oceanographic station can best be understood by reference to FIG. 1. The power supply package 11 will be installed and made part of a removable well from the fuel tank and equipment buoy 12. An intake-exhaust snorkel 13 will be supported and sealed to the power supply package 11 to form an integral removable well unit. The snorkel 13 will in addition act as an antenna support mast, and the ports for intake and exhaust will be protected against the sprays of the sea and sufficiently elevated to escape immersion. The combined power supply package and snorkel structure can be either directly attached to the fuel tank and equipment buoy as shown in FIG. 1, or the structure can be indirectly attached to the buoy through the use of a gimbal to permit independence of motion between the buoy and the snorkel-well structure. The buoyancy of the combined snorkel-well structure can, of course, be controlled by design so as to facilitate the eventual exchange of units at sea.

FIG. 2 is a sectional view of the power supply package 11 shown in FIG. 1, in which the frame 14 will be of welded sheet metal construction as will the greater portion of the power supply package to readily lend itself to manufacture by ordinary machining methods. In the preferred embodiment, propane is permitted to flow as a gaseous fuel down fuel supply line 15 from the fuel tanks which are part of the equipment buoy. This flow is controlled by a pressure regulator 16 which maintains a constant-pressure supply within the range of 2 to 10 inches of water column upon energizing solenoid valve 17. Upon opening solenoid valve 17, the gaseous propane flows through a regulating needle valve or orifice 18 to feed burner 19. Through proper burner design, this released gas inspirates a quantity of atmospheric air, indicated by arrows 20, and mixes with it to produce a combustible mixture within the burner. This mixture, in escaping from the burner in many pre-arranged ports, burns continuously and completely with the supply of air from the surroundings as long as the gaseous fuel, by means of valves 17, is permitted to flow.

As previously mentioned, the liquid propane in the fuel cylinders of the buoy will, when released through a valve into near atmospheric pressure, return to its gaseous state permitting its regulation and use as a gaseous fluid. This makes propane particularly adaptable to oceanographic equipment in that its vapor pressure at normal temperature causes it to flow through the pipes, and unlike that required for gravity fed fuel oil burners, the need for constant-level operation is eliminated. And unlike oil, the propane burner in burner 19 does not leave a residue and, since it can be easily controlled, provides stable operation for long periods without the need for cleaning or maintenance of the regulators, orifices and valves.

The typical boiler-superheater unit comprises a boiler section 21, a superheater section 22 and a manifold section 23. Boiler section 21 comprises a combustion chamber 24, base 25, inner and outer shells 26 and 27 respectively. Between inner and outer shell 26 and 27 is liquid mercury 28 and baffle 29. As in any heat power plant, the burner heats the liquid mercury 28 in the boiler 21 to vaporize the liquid, and then to further heat the vapor in superheater section 22. The superheat section 22 contains a multiplicity of superheat fins 30 which initially heat the mercury vapor due to the combustion of the fuel. The partially superheated mercury vapor flows up the annular section 31 and is further heated by superheat tube 32, this tube 32 continuing outward to the snorkel. As can be seen by the construction, the liquid mercury will receive most of its heat by radiation and convection, whereas the mercury vapor in the superheat section will depend chiefly on the convection of combustion and flue gases. The flue gases in superheat tube 32 will be at a temperature at about 1,000° F, and the mercury vapor in space 31 will be heated to a temperature in the neighborhood of 874° F by the convection from the flue gases.

After the superheat process, mercury vapor enters into the manifold section 23 and into what is perhaps the most critical item in the turbogenerator system, a nozzle assembly 33. An ideal nozzle is one that allows isentropic expansion of the medium as it passes through it, meaning that heat transfer, turbulance, friction, and supersaturation are not permitted. Although it is impossible to prevent such actions, nozzles can be designed in practice to keep such actions to a minimum. Nozzle design depends largely upon the working medium, its state at entrance to the nozzle and its final pressure at exit of the nozzle. These conditions establish the maximum mass-rate of vapor flow and conversion into kinetic energy that can occur within a particular nozzle, and make the construction and fabrication of the nozzle used according to the invention of prime significance.

Figure 3A:
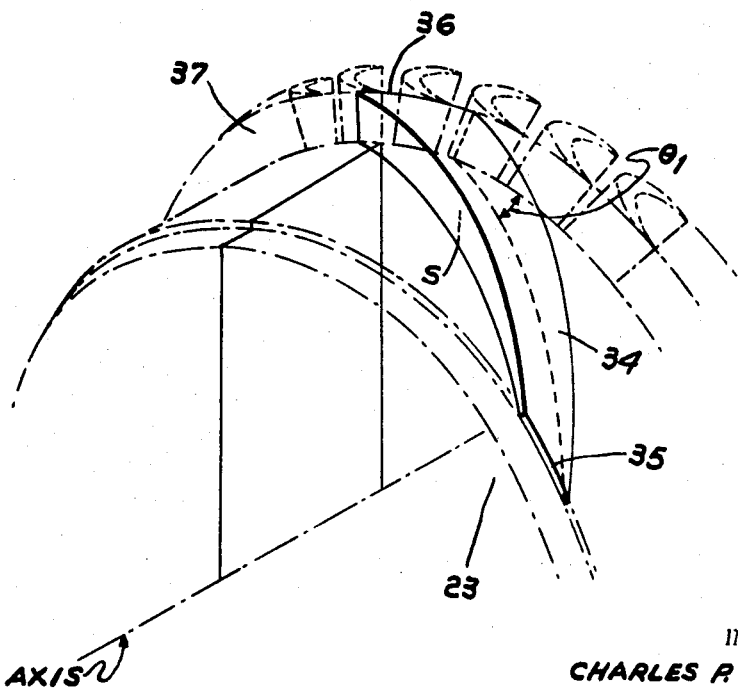
Figure 3B:
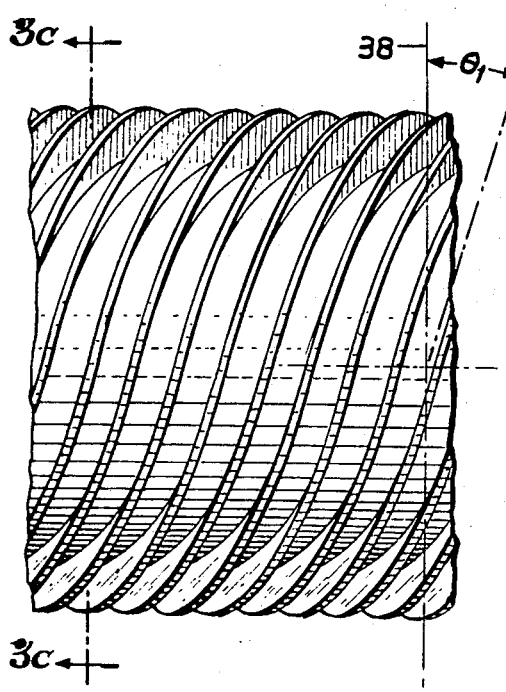

Referring now to FIG. 3a, the outline for one of multiplicity of nozzle 34 is shown, wherein the entrance face 35 is adjacent to manifold 23, and the exit face 36 is adjacent to the vertical face of revolution 37 generated by the edges of the turbine blades shown in phantom lines. The base surface S, a strip of constant width, is a segment of a cylindrical surface oriented in such a manner with respect to vertical face 37 so as to form the included helical lead angle of $\theta_1$. This angle $\theta_1$ in the preferred design is approximately 20°. This nozzle is easily fabricated by taking bar stock and cutting the grooves, as shown in FIG. 3b, such that a helical line 39 along the center of the groove 36 forms the desired helix angle $\theta_1$ with respect to a face 38 perpendicular to the bar axis. The cross section of this bar is shown in FIG. 3c, wherein each exit face of groove 36 generates an angle $\theta_2$ and each web section between the faces is at an angle $\theta_3$.

The angles $\phi_2$ and $\phi_3$ depend on the width of grooves 36 cut in the bar stock. The nozzle body is then machined as shown in FIG. 3d with a proper lead length 41 and of a diameter equal to the root diameter or to that formed by the bottom of groove 36. The nozzle body is further machined with a taper at the included angle $\phi_4$, being in the preferred case approximately 44°, and an overall length controlled by the coincidence of the angle $\phi_4$ with the outer diameter of the webs.

The shroud of the nozzle assembly is shown in FIG. 3e, wherein the shroud length 43 is the same as length 40 of the nozzle body. The bore of the shroud is cut at the angle $\theta_4$ which is in the preferred case, 44° as that of the nozzle body. The root diameter 44 is equal to the root diameter 42 of the nozzle body plus twice the desired throat dimension.

Figure 3C:
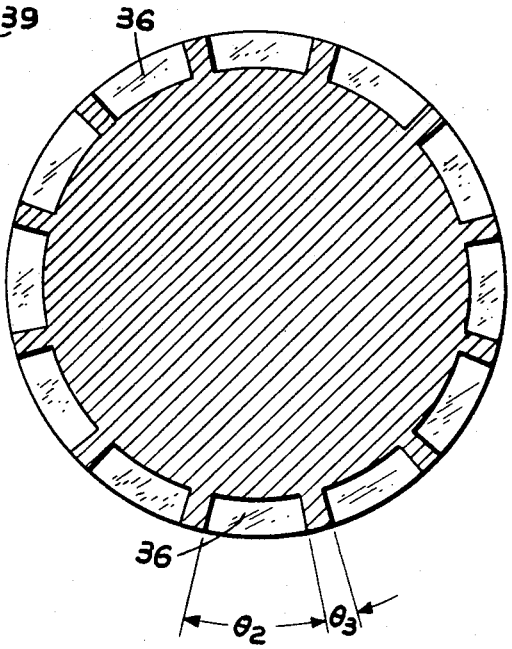
Figure 3D:
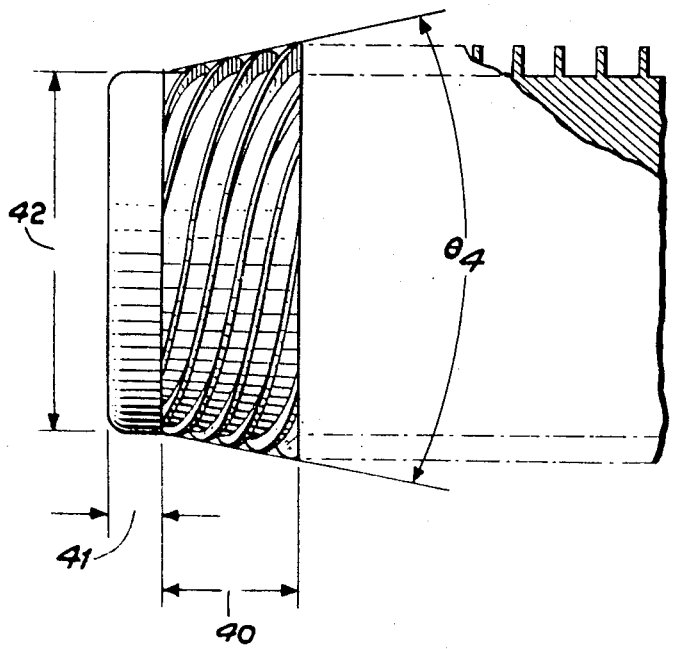

As a practical example, referring to FIG. 3c, for a multiplicity of equally spaced 8° divergent nozzles, $\theta_2$ would be 25° and $\theta_3$ would be 5°. This would provide 12 equally spaced grooves having at their exit face a pitch diameter of 6.875 inches, a root diameter of 6.375 inches, and an outer diameter of 7.375 inches. Referring further to FIG. 3d, the nozzle length 40 would be 1.312 inches and $\theta_4$ would be 44°. Referring to FIG. 3c the overall length for the shroud would be 1.312 inches and the tapered bore would be 44°.

Figure 3F:
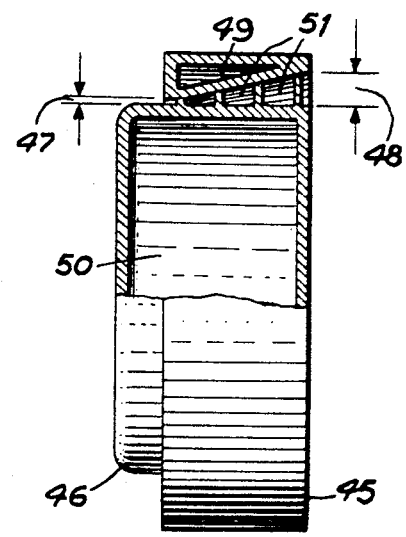

Referring to FIG. 3f, the minimum diameter for the tapered bore would be equal to the root diameter of 6.375 plus twice the desired throat dimension for the nozzle.

The complete nozzle assembly is shown in FIG. 3f. A shroud 45 is assembled over a body 46 to form a nozzle throat inlet 47 and outlet 48. The shroud 45 has been hollowed, evacuated, and sealed according to known methods to create space 49; and body 46 has also been hollowed, evacuated, and sealed to create space 50. The desired space 49 and 50 in the shroud and body is to decrease the transfer of heat from the hot vapors in the manifold to expanding vapors within the nozzles. The mercury vapor entering the nozzle throat 47 will not be as readily reheated by conduction of heat from the manifold as it would if the shroud and the nozzle were of solid mass. The mercury vapor entering throat 47 is at a temperature of approximately 874° F, and the exit temperature from outlet 48 is approximately 260°, providing a desired condition for driving the turbine wheels.

To achieve optimum conditions, the reheat of the hot vapor passing through each of spiral passages 51 of the nozzle assembly, is kept at a minimum by reducing the mass of the shells of nozzle 46 and shroud 45, and by evacuating and sealing them according to known methods.

Referring again to FIG. 2 the mercury vapor enters manifold 23 at approximately 874° F and exits from the nozzle assembly 33 at a temperature of approximately 260° F, the preferred exit angle being 20° to impart to wheel assembly 52 a maximum kinetic energy. The stationary wheel 53 is for reversing the vapor flow in order to produce velocity compounding according to known methods. The wheels 52 and 53 may be manufactured from ferrous metals or plastic. The ferrous metals used may be a plain steel, a stainless steel, or a "Stellite" as manufactured by Union Carbon and Carbide Co. The plastic wheels or individual blades may be composed of a glass-filled polycarbonate, or a glass filled "Polysulfone."

The mercury vapor jet rotates the wheel assembly 52 at a velocity suitable in ratio to the vapor velocity and directly drives permanent-magnet rotor 54 mounted on bearings 55 which, in turn causes the production of electric energy within stator 56. This electrical energy will then charge batteries thru appropriate circuits and controls hereinafter described. As is well known, multipole permanent magnet rotors operating within a multiphase stator are considered very practical for producing the electrical energy according to the invention. The use of a three-phase circuit decreases the size of the generator while the use of the two-pole or four-pole rotors enables the use of suitable rotor speeds for single stage or velocity compounded turbines when producing a 400-cycle supply.

Since the vapor finally leaving the blading of wheels 52 approaches a velocity of 230 feet per second, there is created a turbulant condition within space 58 of condenser 57. FIG. 2a shows a side view of condenser 57. The turbulent conditions, plus the fact that mercury does not wet the condenser surface and causes a beneficial dropwise condensation, produces comparatively negligible resistance to transfer of heat to the condenser wall. The vapor returns to liquid form in condenser 57 due to the cooling caused by the free circulation of external sea water indicated by arrows 59. Thereafter, the condensed mercury, due to its very high density, is returned by gravity to the boiler by means of feed line 60.

In keeping with the object of a maximum efficiency power supply, the heat losses from the boiler and superheater must be kept at a minimum. This is most effectively accomplished by insulation 61 which reduces radiant heat losses and convection losses. The insulation 61 will be composed of spun mineral fibers held together with an organic binder, this used in conjunction with reflected type insulation such as aluminum foil. Any heat lost through the insulation will preheat the incoming air 20 for combustion.

Through the use of a permanent-magnet generator, the mechanical output of the turbine wheels can be converted into useful electrical energy which, in turn, can be contained within a storage battery until required. Such a mechanical-to-electrical conversion system has four principle parts, shown in FIG. 4, a electric generator 62, a constant current charger 63, a battery 64, and a charging cycle control circuit 65. This basic energy conversion system has one power input, the rotating mechanical shaft, and two electrical outputs, one as a power source for operating the detecting, collecting, and transmitting equipment, and the other as a signal source for controlling the operation of the system, i.e., signal to the fuel supply control valve.

Since long-time reliability and high efficiency are essential in this system, the interconnections of all components must be made with minimum loss. Knowledge of input and output characteristics for each of these components is therefore necessary to achieve this and to optimize the performance of each of these components so that the electrical energy is not wasted or lost.

The selection of the battery system, whether to use a primary or a rechargeable battery system is based on a consideration of its capacity and on economics. If during the useful life of the battery powered equipment, the total energy required exceeds the energy of one discharge, the application calls for a rechargeable secondary cell battery. However, if the secondary cell battery is used in an inaccessible location for a period of time in which the energy requirement exceeds that available in a single discharge, some other form of energy must be available to recharge the secondary cell battery. The choice of the proper rechargeable secondary cell can be made if their characteristics are wisely considered.

Three cell types are considered most suitable of the many available for operating the system disclosed. These batteries are of a silver-zinc type, silver-cadmium type, and nickel-cadmium type, the key items being battery life, weight and cost, with the most important feature for remote applications being life.

Under normal conditions, silver-cadmium and nickel-cadmium batteries have similar life characteristics and both have three to five times the life of the silver-zinc battery. Since the primary goal for the electrical power system is the most reliable operation for the longest period of time, the battery charging program should be of the constant current type. Two considerations indicate this to be the best technique; battery life is extended by charging more slowly at a constant current and charging efficiency is highest, thereby minimizing the amount of energy required to bring the battery to a fully charged state.

A more detailed block diagram of the energy conversion system is shown in FIG. 5, this detailed energy cycle further includes another constant current charge 66, an auxiliary battery 67, a fuel control 68, a sea state sensor and timer 69, and high and low voltage control means 70. In the total energy cycle, beginning with the burning of propane to the rotation of the generator shaft, the control is extremely simple. The supply and ignition of propane starts the battery charging cycle. The cutoff of propane supply simply stops the process.

A command signal 71 to start a charging cycle originates when the battery 64 voltage drops below a prescribed value. A command signal to stop charging is given when the battery 64 voltage reaches a preset value. Since some energy is necessary to perform these commands to power semi-conductor amplifiers in the control circuits and to operate the fuel valve, a small auxiliary battery 67 will be charged by 66 when the battery 64 is charged. The charging circuitry for the auxiliary battery will be designed to prevent any loading by the main instrumentation devices. This arrangement is necessary to insure availability of more than sufficient energy to start a charging cycle should excessive drain occur on the battery 64.

To start the turbogenerator, command 72 must activate the fuel valve and glow plugs. The use of glow plugs is one of several ways to ignite the fuel. The actual fuel control operates from either battery 64 or the auxiliary battery 67.

Since the reliability of the turbogenerator will be improved and its performance enhanced, if its operation is restricted to low sea states, the sensor 69 is used to circumvent the circuit control command 72 and cause the turbogenerator to be dormant for a set period until the storm has subsided. The sea-state sensor would be of the type measuring the accelerations of the buoy's motion. These accelerations can be correlated and integrated to produce a single signal that represents the roughness of the sea. This single signal can then command the charge cycle control circuit 65 to prevent fuel flow into the burner until a definite time has elapsed. Such a feature for prolonging turbogenerator life must, of course, be designed as fail safe.

It should be noted that for short operating periods of 100 days or less, little preference can be shown between battery types mentioned above. However, when the required operating period exceeds 250 days, a silver-cadmium or nickel-cadmium battery is preferred since their lives are rated at three years while that of a silver-zinc battery is rated at only 12 to 18 months. Again, since reliability is most important in this type of equipment, the choice of a battery in the preferred embodiment is a silver-cadmium type for both battery 64 and auxiliary battery 67.

It should also be pointed out that when operating, a minor part of the turbogenerator output can sustain the instruments while the major part is charging the batteries. When the batteries are fully charged, the turbogenerator will stop and remain dormant until further cumulative drain of battery-stored power for operating the remote station reduces the stored energy to a minimum level. The turbogenerator will again operate to repeat the cycle as often as required, in fact, the simplicity of design herebefore described is such that it can be manufacture by ordinary and economical mass-production methods. Such that the system can, for long-time use or for military purposes, become expendible.

FIGS. 6a and 6b are simplified drawings of the power supply package to illustrate a means of lubrication for the mercury vapor turbogenerator of the invention. The boiler 73 is connected to the superheat tube 74 to nozzle 75 which, by means of the mercury vapor rotates turbine wheels 76, and rotor 77 is mounted in bearings 78. The condenser 79 is connected by return feed line 80 to the boiler 73. After thermal purging and evacuation, according to known methods, the turbogenerator unit is charged with a predetermined quantity of liquid mercury 81 and a silicone fluid 82. Fluorosilicone fluids are also suitable in this application.

Initially, the boiler 73 boils off the silicone fluid 82 and the liquid mercury 81 to be recondensed in condenser 79. The silicone fluid 82, as shown in FIG. 6b, because of its lesser density floats on top of the column of liquid mercury 81 in the return line 80. As additional mercury condenses it drops through the condensed silicone fluid and into the return feed line 80 where it is fed by the gravity back into the boiler. The silicone fluid because of the turbulant condition existing in space 83 as herebefore described, will cause silicone vapors to lubricate the ball bearings 78 on contact. Therefore, it can be seen that the choice of the proper silicone fluid, in connection with normal vapor pressures and operating temperatures of the system, provides a suitable means of lubrication for the mercury vapor turbogenerator in keeping with the principle of long-term unattended life for a remote telemetering station.

Another means of lubrication for the mercury vapor turbogenerator is shown by a simplified drawing of the power package in FIG. 7, where 80 is the boiler, 85 the superheat section, 86 the nozzle section, and 87 represent the turbine wheels. The rotor 88 of the generator is mounted by bearings 89, however, associated with bearing 89 is a plurality of oilers 90. Condenser 91 contain a feed line 92 to feed the oilers 90. In return line 93 is a collector 94 which is associated with the operation of the feed line 92 and oilers 90. Again, the liquid lubricant 95 floats on the liquid mercury 96. The collector 94 is a fixed sheet metal configuration that through proper design separates liquid lubricant from liquid mercury and distributes the lubricant to drip-type oilers 90 at the start of every cycle of turbine operation.

This is achieved by giving appropriate dimensions to the bell shape of the collector, so that the pressure differential between boiler and condenser is used to pump the liquid lubrication 95 into the oilers 90 before each cycle of turbine operation. This is more readily understood by reference to FIGS. 8a through 8c.

Upon ignition, at the start of an operating cycle, the top most level of lubricant 95 is as shown in FIG. 7 since the pressure in the boiler and condenser is about the same. However, in developing a steady-state operation, the height of the combined liquid lubricant 95 and the mercury 96 in the return line 93 increases as the boiler pressure increases. In the course of this increase the level of lubricant 95 approaches the collector as shown FIG. 8a, and progresses further as shown in FIGS. 8b and 8c.

In proper design the cross-sectional area $A_1$, FIG. 8a, at the mouth of the internal bell 97 is quite large compared to the annular cross-section $A_2$, and cross-sectional area $A_3$ of the feed line 92 is quite small compared to the annular cross section $A_4$.

When the level of the mercury 96 reaches the lip of the internal bell 97 of collector 94, the majority of the liquid lubricant 95 is entrapped in the section $A_1$ and a minor portion in the annular section $A_2$. Further rise of the mercury level beyond this level progressed at two different rates; that within the bell 97 is retarded compared to that in the annular space, since the structural configuration causes an accelerated rise to the level of the liquid lubricant 95 entrapped within the bell 97 as shown in FIGS. 8b and 8c.

By nature, the column height "Y" of the liquid lubricant 95 within the bell and feed line 92 will exert the same stress at the reference plane as the height "X" of the combined lubricant and mercury column within the annular space between external bell 94 and internal bell 97, and between external feed line 93 and internal feed line 95. For example, liquid mercury has a specific gravity of 13.5 and liquid silicone has a specific gravity of 0.9, the rate of rise of the silicone in the feed line compared to that in the return line 93 will be approximately 15:1.

In passing through a required range of 30 inches of mercury column to achieve steady-state operating conditions, the mercury level in the return line easily pumps lubricant into the drip oilers from whence it can be dispensed into bearings as required over many hours of operation. Each time the turbogenerator is restarted, in the proposed charging cycle of an unattended oceanographic station, this pumping process is automatically repeated and provides a reliable means of long-term lubrication for the system.

At this point sufficient knowledge has been gained from the preceeding description to appreciate the performance of this complete power supply system for a remote telemetering station. Such a system comprises a fuel supply, a turbogenerator, and a storage battery. The fuel supply is a container of liquid propane having associated piping with the appropriate pressure and flow regulators. This container is storage tank whose structural strength is defined by the pressure of vapor at elevated temperatures and by the environment to which the tank will be subjected. Such installations are within the state of the art and no unusual problems can be foreseen.

The required capacity for the storage fuel is, of course, determined by the power demands of the telemetering station coupled with the chosen period for unattended operation. When operating, a minor part of the turbogenerator output can sustain the telemetering instruments while the major part is charging the batteries. When the batteries are fully charged, the turbogenerator will stop and remain dormant until further cumulative drain of battery-stored power for operating the station reduces the stored energy to a minimum level. The system will again operate to repeat the cycle as often as required.

The greater portion of the boiler, frame, superheater, condenser, and mounting will consist of welded sheet metal construction. All other items with the possible exception of the turbine wheels, readily lend themselves to manufacture by ordinary machining methods, i.e., as disclosed for the nozzle. The turbine wheels are, however, adaptable to manufacture by precision-casting and molding technique using the materials hereinbefore suggested. Vacuum and thermal purging will, of course, be rendered during the final stages of assembly and prior to final test.

In a power supply system for unattended oceanographic stations according to the invention, propane vapor is permitted to flow as a gaseous fuel from a tank, which is part of an equipment buoy, when a solenoid valve is energized. The flow is controlled by a constant head-device and a regulating needle value or orifice to feed a burner. As in any heat power plant, the burner heats liquid mercury in a boiler to evaporate it and the to further heat its vapor in a superheater. After expansion in a novel nozzle, according to the invention, the mercury-vapor jet rotates a turbine wheel assembly whose blades travel at a linear velocity suitable in ratio to the vapor velocity. The vapor thereafter reverts to liquid form in a condenser which is cooled by the free circulation of external sea water. The condensed mercury, due to its very high density, is returned by gravity to the boiler in a feed line. The rotating turbine wheels directly drive a permanent-magnet rotor which, in turn, causes production of electrical energy within a stator, which is used to recharge batteries through the appropriate circuits and controls. In addition, means are provided for lubrication of the mercury-vapor turbogenerator to permit long uninterrupted life, and as such to be suitable for remote locations at sea.

While we have described above the principles of our invention in connection with specific apparatus, it is to be clearly understood that this description is made only by way of example and not as a limitation to the scope of our invention, as set forth in the objects thereof and in the accompanying claims.

We claim:
1. A method of producing a nozzle comprising the steps of:
   cutting a multiplicity of constant width spiraling grooves on a constant diameter bar to form the body of said nozzle;
   cutting a predetermined taper on the circumference of the body to the root diameter formed by the grooves and to a predetermined length;
   forming a shroud equal to said predetermined length to fit over said tapered body, and said shroud being formed to have a root diameter equal to the root diameter of the nozzle body plus twice the determined throat dimension; and
   assembling said body and shroud to form a multiplicity of nozzle inlets and nozzle outlets.
2. The method of claim 1 including the step of forming a cavity within said body.
3. The method of claim 2 including the step of evacuating and sealing said body cavity.
4. The method of claim 1 including forming a cavity within said shroud.
5. The method of claim 4 including the step of evacuating and sealing said shroud cavity.
6. A method of producing a nozzle for a turbogenerator comprising in combination the steps of:
   cutting a multiplicity of constant width spiraling grooves on a constant diameter bar to form the body of said nozzle;
   cutting a predetermined taper on the circumference of the body to the root diameter formed by the grooves and to a predetermined length;
   forming a cavity within the body;
   evacuating and sealing said body cavity;
   forming a shroud equal to said predetermined length to fit over said tapered body;
   forming a cavity within said shroud;
   evacuating and sealing said shroud cavity; and
   assembling said body and shroud to form a multiplicity of nozzle inlets and nozzle outlets.

* * * * *